B. E. PICKEL.
AUTOMOBILE LOCK.
APPLICATION FILED JUNE 26, 1919.
1,318,913.
Patented Oct. 14, 1919.
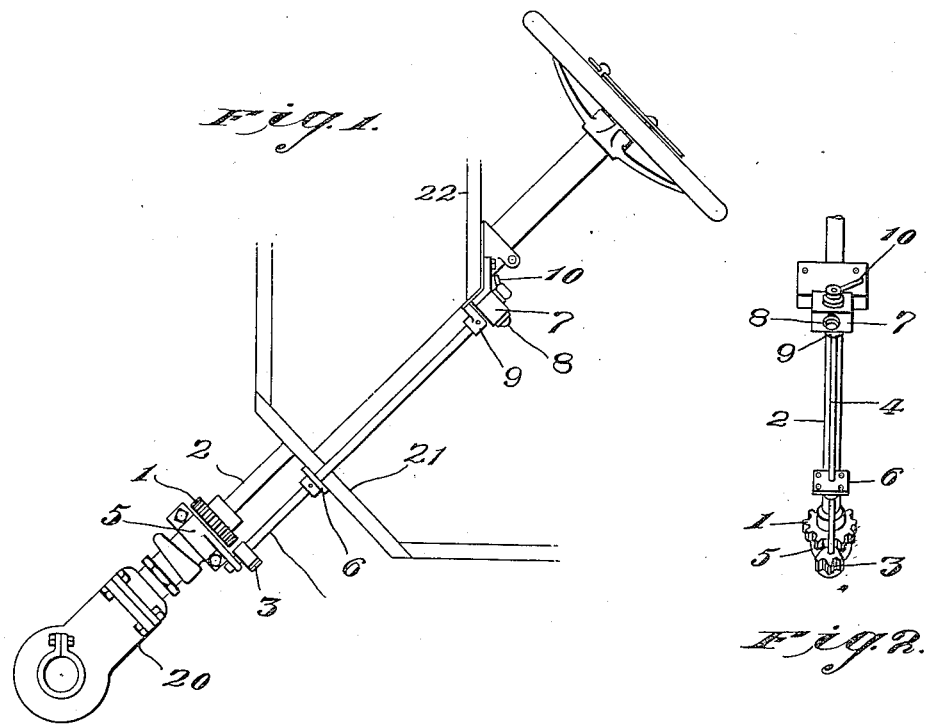
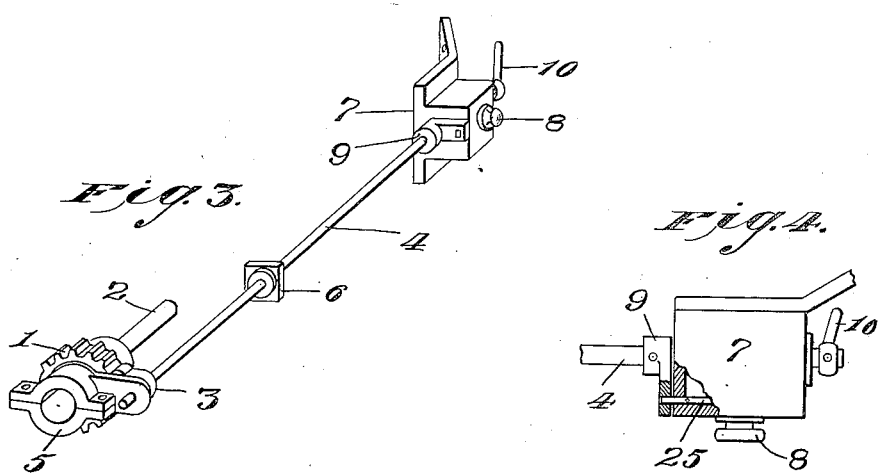
WITNESSES
INVENTOR
B. E. PICKEL
BY
ATTORNEYS

UNITED STATES PATENT OFFICE.

BURGEN ELSWORTH PICKEL, OF EASTON, PENNSYLVANIA.

AUTOMOBILE-LOCK.

1,318,913. Specification of Letters Patent. Patented Oct. 14, 1919.

Application filed June 26, 1919. Serial No. 306,828.

*To all whom it may concern:*

Be it known that I, BURGEN E. PICKEL, a citizen of the United States, and a resident of Easton, in the county of Northampton and State of Pennsylvania, have invented a new and Improved Automobile-Lock, of which the following is a full, clear, and exact description.

The object of the invention is to provide a new and improved automobile lock more especially designed for locking the steering mechanism to prevent unauthorized persons from running away with the automobile. Another object is to permit of installing the lock on automobile steering mechanisms as now constructed and without requiring alteration thereof.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the automobile lock as applied to the steering post of the steering mechanism of an automobile;

Fig. 2 is a rear elevation of the same;

Fig. 3 is a perspective view of the automobile lock; and

Fig. 4 is an enlarged side elevation of a portion of the automobile lock with parts in section.

A gear wheel 1 is secured to the steering post 2 of the usual steering mechanism of an automobile, and the said gear wheel 1 is adapted to be engaged by a segmental pinion or toothed quadrant 3 secured on a shaft 4 arranged parallel to the steering post 2 and journaled in suitable bearings 5, 6 and 7, of which the bearing 5 is secured on the housing 20 of the steering mechanism, the bearing 6 is attached to the floor 21 of the automobile, and the bearing 7 is attached to the work board 22 of the automobile. The bearing 7 provides a casing for a lock 8 of any approved construction, preferably, however, of the permutation type, and having a bolt 25 adapted to engage a keeper 9 secured on the shaft 4. The upper end of the shaft 4 is provided with a handle 10 under the control of the driver of the automobile and within convenient reach of the same.

Normally the segmental pinion 3 is out of mesh with the gear wheel 1 and hence the steering post 2 can be readily manipulated in the usual manner for steering the automobile. When the pinion 3 is in the position shown and mentioned then the keeper 9 is out of alinement with the bolt 25 of the permutation lock 8.

When it is desired to lock the steering mechanism to prevent an unauthorized person from running away with the automobile then the operator turns the handle 10 to rotate the shaft 4 and engage the segmental pinion 3 with the gear wheel 1 and at the same time move the keeper 9 into alinement with the bolt 25, as shown in Fig. 4. The operator now manipulates the lock 8 to shoot out the bolt 25 into engagement with the keeper 9 thus locking the latter against turning and likewise the shaft 4 and the segmental pinion 3, which latter prevents rotation of the gear wheel 1 and the steering post 2. It is understood that the bolt 25 cannot be retracted unless the permutation lock is set to the proper combination, known only to the driver of the automobile, and hence an unauthorized person cannot unlock the keeper 9. When the driver of the automobile desires to start, he sets the permutation lock 8 to the proper combination and retracts the bolt 25, and then the driver turns the handle 10 to turn the shaft 4 and thereby move the segmental pinion 3 out of mesh with the gear wheel 1 to allow turning of the steering post 2 for steering purposes.

It will be noticed that the automobile lock shown and described can be readily applied to steering mechanisms of automobiles as now generally constructed and without requiring alteration thereof.

Having thus described my invention, I claim as new and desire to secure by Letters Patent:—

1. A device for locking the steering mechanism of an automobile against turning, comprising a shaft under the control of the driver of the automobile, co-acting locking means connecting the said shaft with the steering mechanism of the automobile to lock the said steering mechanism, a keeper on the said shaft, and a lock having a bolt adapted to engage the said keeper to lock the shaft against rotation at the time the said co-acting locking means are in locking position.

2. An automobile lock for locking the steering post against turning, comprising a member secured on the steering post, a shaft adapted to be turned by an operator and provided with a locking member adapted to engage the said steering post member, a keeper on the said shaft, and a lock having a bolt adapted to engage the said keeper at the time the locking member is in engagement with the said steering post member.

3. A device for locking the steering mechanism of an automobile, comprising a gear wheel secured to the steering post, a shaft parallel to the steering post and provided with a handle under the control of the driver of the automobile for turning the said shaft, a segmental pinion on the said shaft and adapted to engage the said gear wheel, a keeper secured on the said shaft, and a lock having a bolt adapted to engage the said keeper at the time the said pinion is in mesh with the said gear wheel.

4. A device for locking the steering mechanism of an automobile, comprising a gear wheel secured to the steering post, a shaft parallel to the steering post and provided with a handle under the control of the driver of the automobile for turning the said shaft, a segmental pinion on the said shaft and adapted to engage the said gear wheel, a keeper secured on the said shaft, and a lock having a fixed casing forming a bearing for the handle end of the said shaft, the said lock having a bolt adapted to engage the said keeper at the time the said pinion is in mesh with the said gear wheel.

BURGEN ELSWORTH PICKEL.